Patented Jan. 30, 1934

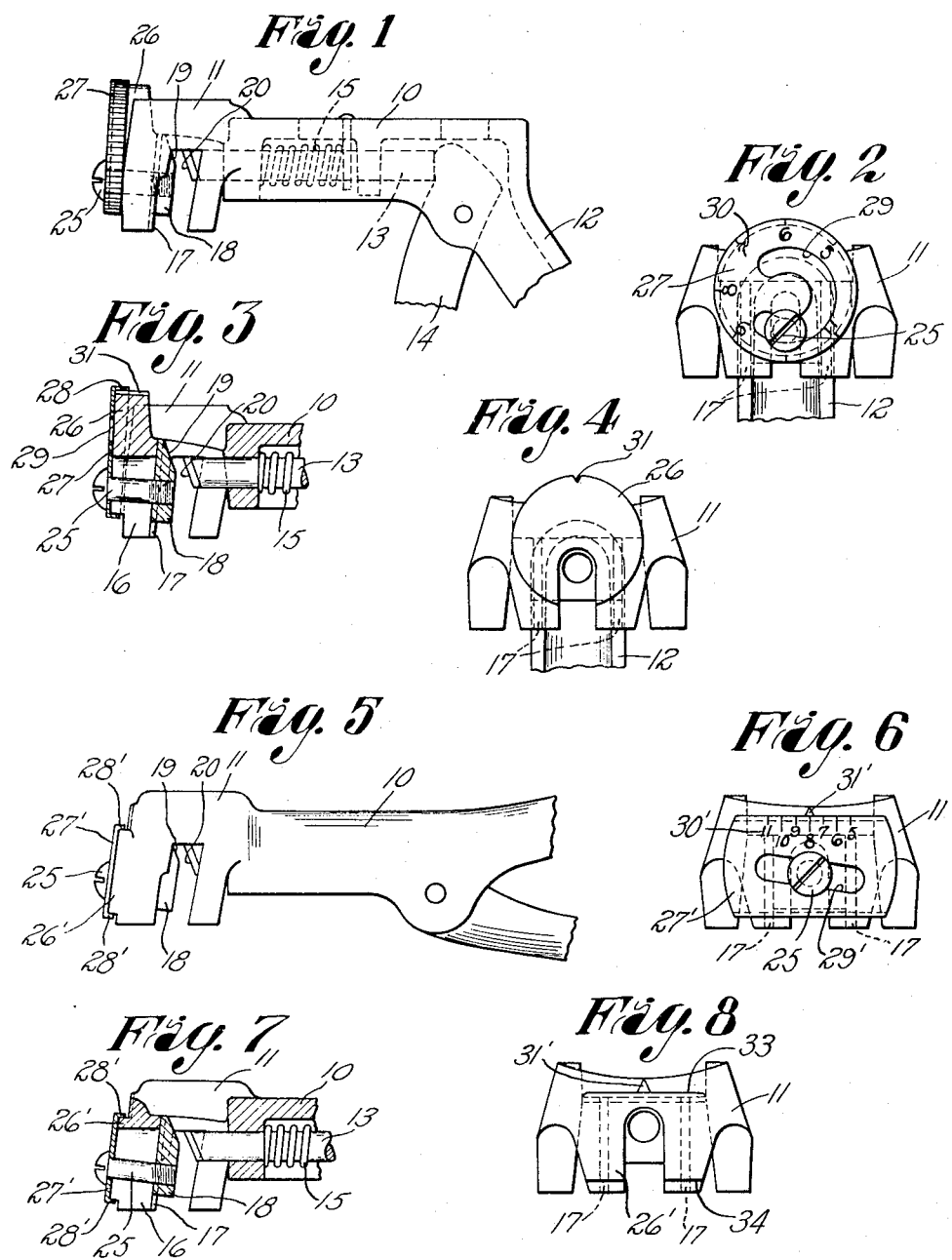

1,945,335

UNITED STATES PATENT OFFICE 1,945,335

SAW SET

Austin L. Stowell, New Britain, Conn., assignor to The Stanley Works, New Britain, Conn., a corporation of Connecticut Application May 28, 1931. Serial No. 540,660

1 Claim. (Cl. 76—69)

This invention relates to the art of devices for setting saw teeth, and has particular reference to means for adjusting the anvil with which devices of this sort are provided.

The aim of the invention is to provide a saw set with improved means of a very simple and yet effective nature for accurately adjusting the anvil to give a greater or lesser set to the saw teeth as desired, and also for securing the anvil against displacement from its adjusted position. The improvements of the present invention may be incorporated in a saw set at a relatively low cost so that a more efficient tool is obtained at relatively small additional expense.

Other objects will be in part obvious and in part pointed out more in detail hereinafter.

The invention accordingly consists in the features of construction, combination of elements and arrangement of parts which will be exemplified in the construction hereinafter set forth and the scope of the application of which will be indicated in the appended claim.

In the accompanying drawing, wherein are shown two embodiments which the present invention may take:

Figure 1 is a side elevational view of a complete saw set except for the handles;

Fig. 2 is an elevational view looking at the forward end of the tool;

Fig. 3 is a longitudinal vertical sectional view taken through the head of the tool;

Fig. 4 is an elevational view looking at the forward end of the frame, this view being similar to Fig. 2 but with the cam plate removed; and Figs. 5, 6, 7 and 8 are views respectively corresponding to Figs. 1, 2, 3 and 4 but showing another embodiment of the invention.

Referring to the drawing in detail, the saw set, for illustrative purposes, is shown as having a frame comprising a housing 10, a head 11 at the forward end of the housing, and a handle 12 extending from the rear end of the housing. The numeral 13 designates the usual plunger supported for longitudinal movement in the housing and adapted to be operated by a pivoted lever or handle 14. The usual spring 15 is employed for returning the plunger and the handle 14 to inoperative or normal positions. The forward wall of the head 11 has a notch or slot 16 and, on the inner face of the forward wall and to opposite sides of the notch, are ribs 17 which form a keyway or groove in which the anvil 18 is mounted for vertical adjustment. The anvil is provided with an inclined bearing surface 19 which is parallel to and in front of the face 20 on the forward end of the plunger. The arrangement so far described is of the usual construction and is shown by way of illustration only.

In accordance with the present invention, there is provided a cam plate adjustable in a predetermined path with respect to the head and adapted to cooperate with the device for holding the anvil in place, and which device, in the present instance, is in the form of a screw 25. In the embodiment shown in Figs. 1 to 4, this cam plate is rotatably adjustable about a fixed axis, while in the embodiment shown in Figs. 5 to 8, the cam plate is mounted for rectilinear adjustment.

Referring to the first embodiment illustrated, the saw set frame has, on its forward end, a boss or guide 26 of circular or cylindrical form. The notch 16 extends radially into this boss, as shown most clearly in Fig. 4. The cam plate is in the form of a round disk 27 having a cylindrical and circumferential flange 28 of such diameter as to more or less closely receive the boss 26. The cam plate 27 has a cam groove 29, the radius of which gradually increases from one end to the other so that it is inclined, so to speak, with respect to the axis about which the plate is adjustable. In the present instance, this cam groove is somewhat in the form of a spiral and corresponds in width substantially to the diameter of the screw 25. The external periphery of the flange 28 may be knurled, as illustrated, so that the fingers will not slip while adjusting the cam plate. Also, the cam plate may be provided with angularly spaced apart numerals 30 which correspond to the different numbers of teeth per inch with which saws are provided, and the boss has an indicating mark or notch 31 with which these numbers may be selectively brought into registry.

In the second embodiment shown in Figs. 5 to 8, the saw set body is provided with a boss 26' having straight upper and lower walls 33 and 34, respectively, which are generally at right angles to the length of the notch 16. The cam plate 27' has straight flanges 28' on its upper and lower edges, and these flanges are so spaced apart as to closely receive between them the boss 26'. The cam plate 27' has a straight but inclined cam groove 29'. The numerals 30' correspond to the like numerals 30 of the preceding embodiment, while the indicating mark 31' corresponds to the notch 31.

The manner in which the anvils are adjusted will be clear from the foregoing description taken in connection with the following explanation. In the first embodiment, when it is desired to adjust the anvil, the screw 25 is slightly loosened and then the cam plate is turned so as to bring that numeral 30, which corresponds to the number of teeth on the particular saw to be corrected, into registry with the notch 31. If the saw is provided with eight teeth per inch, the number eight is brought into registry with the notch 31. When the cam plate is thus turned, it will, through the screw 25, move the anvil 18 to the desired position. Then the screw is tightened up, thereby clamping the anvil against its seat and also forcing the cam plate tightly against the boss which it surrounds so that the cam plate will not accidentally turn. When the device is being used, there is a tendency, owing to the angularity of the faces 19 and 20, for the anvil to move downwardly, but such movement is positively prevented due to the engagement between the stem of the screw and the external edge of the cam slot. Thus, should the friction between the anvil and its seat not be sufficient to hold the anvil in adjusted position, movement of the anvil is absolutely guarded against by the cam plate.

In the embodiment shown in Figs. 5 to 8, the adjustment is effected in the same general way, except that the cam plate is moved rectilinearly instead of being rotated.

It will be seen that, in each embodiment, the means for determining the adjustment of the anvil and for securely locking the anvil against displacement after it has been adjusted, is extremely simple and adds but little to the expense of the tool. The bosses, which serve as guides for the cam plates, may, if desired, be formed integrally with the frame of the saw set at practically no additional expense. The cam plates may be formed of sheet metal. The adjustment of the anvil may be very easily and yet accurately accomplished and, as above pointed out, the anvil is securely held in adjusted position and against accidental displacement after it has been adjusted and the screw has been tightened up.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claim is intended to cover all of the generic and specific features of the invention herein described and all statements of the scope of the invention which, as a matter of language, might be said to fall therebetween.

I claim as my invention:

In a saw set, a frame having a boss, an anvil adjustable relative to said frame, a movable cam plate supported and guided by said boss and having a cam slot therein, a screw carried by said anvil for clamping said anvil against the frame, said screw passing through the boss, the frame, and the cam slot and adapted to have its head engaging said cam plate to clamp the same against said boss.

AUSTIN L. STOWELL.